(12) United States Patent
Foster et al.

(10) Patent No.: US 8,745,346 B2
(45) Date of Patent: Jun. 3, 2014

(54) TIME MANAGED READ AND WRITE ACCESS TO A DATA STORAGE DEVICE

(75) Inventors: David Foster, Bellevue, WA (US); Ricardo Lopez-Barquilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/050,176

(22) Filed: Mar. 18, 2008

(65) Prior Publication Data

US 2013/0145112 A1    Jun. 6, 2013

(51) Int. Cl.
  *G06F 12/00*        (2006.01)
(52) U.S. Cl.
  USPC ............ 711/163; 711/100; 711/E12.001
(58) Field of Classification Search
  None
  See application file for complete search history.

(56) References Cited

U.S. PATENT DOCUMENTS

| | | | | |
|---|---|---|---|---|
| 3,812,475 | A * | 5/1974 | Christiansen et al. | 710/7 |
| 5,293,424 | A * | 3/1994 | Holtey et al. | 713/193 |
| 6,449,607 | B1 * | 9/2002 | Tomita et al. | 707/823 |
| 6,487,646 | B1 | 11/2002 | Adams et al. | |
| 7,010,528 | B2 * | 3/2006 | Curran et al. | 707/202 |
| 7,159,120 | B2 | 1/2007 | Muratov et al. | |
| 7,448,077 | B2 * | 11/2008 | Curran et al. | 726/12 |
| 2001/0047347 | A1 * | 11/2001 | Perell et al. | 707/10 |
| 2002/0159469 | A1 * | 10/2002 | Arimura | 370/441 |
| 2002/0188626 | A1 * | 12/2002 | Tomita et al. | 707/205 |
| 2003/0028652 | A1 | 2/2003 | Bardini et al. | |
| 2004/0025053 | A1 | 2/2004 | Hayward | |
| 2004/0153171 | A1 * | 8/2004 | Brandt et al. | 700/9 |
| 2005/0114672 | A1 * | 5/2005 | Duncan et al. | 713/182 |
| 2005/0206353 | A1 | 9/2005 | Sengoku | |
| 2006/0010150 | A1 * | 1/2006 | Shaath et al. | 707/102 |
| 2006/0026552 | A1 * | 2/2006 | Mazzitelli et al. | 717/101 |
| 2006/0190552 | A1 * | 8/2006 | Henze et al. | 709/216 |
| 2006/0196116 | A1 * | 9/2006 | Zettl | 705/1 |
| 2007/0016537 | A1 | 1/2007 | Singh et al. | |
| 2007/0050362 | A1 * | 3/2007 | Low et al. | 707/8 |
| 2007/0198462 | A1 * | 8/2007 | Ohta et al. | 707/1 |
| 2007/0220616 | A1 | 9/2007 | Oh | |
| 2007/0223515 | A1 | 9/2007 | Urata | |
| 2007/0239988 | A1 | 10/2007 | Atzmony et al. | |
| 2007/0250924 | A1 | 10/2007 | Ono et al. | |
| 2009/0055637 | A1 * | 2/2009 | Holm et al. | 713/1 |

(Continued)

OTHER PUBLICATIONS

Strunk, et al., "Self-Securing Storage: Protecting Data in Compromised Systems", Proceedings of the 4th USENIX OSDI Symposium, Oct. 23-25, 2000, pp. : 165-180, http://www.usenix.org/events/osdi00/full_papers/strunk/strunk_html/.

(Continued)

*Primary Examiner* — Matthew Bradley
*Assistant Examiner* — Daniel Bernard
(74) *Attorney, Agent, or Firm* — Steve Wight; Carole Boelitz; Micky Minhas

(57) ABSTRACT

Time managed read and write access to a data storage device. As a part of time managed read and write access to a data storage device, a request for read and/or write access to the data storage device is accessed and it is determined whether the request for read and/or write access to the data storage device is to be granted. Based on the determination, read and/or write access to the data storage device is either allowed or blocked. If read and/or write access is allowed, read and/or write access is terminated after passage of a predetermined period of time.

20 Claims, 6 Drawing Sheets

(56) References Cited

U.S. PATENT DOCUMENTS

| | | | |
|---|---|---|---|
| 2009/0282469 A1* | 11/2009 | Lynch et al. | 726/11 |
| 2010/0017889 A1* | 1/2010 | Newstadt et al. | 726/28 |
| 2012/0167179 A1* | 6/2012 | Evans et al. | 726/4 |

OTHER PUBLICATIONS

"Control Peripheral Devices to Eliminate Data Leakage", http://www/lumension.com/usb_security.jsp.

* cited by examiner

TIME MANAGED READ AND WRITE ACCESS TO A DATA STORAGE DEVICE

BACKGROUND

Digital rights management (DRM) is an umbrella term that refers to access control technologies used by publishers and copyright holders to limit usage of digital media or devices. It may also refer to restrictions associated with specific instances of digital works or devices. Digital rights management technologies attempt to control use of digital media by preventing access, copying or conversion by end users to other formats.

Digital rights management technologies limit access to protected files. Many of these technologies limit access to protected files through the use of software. Moreover, the software effected limitations generally limit access to the file itself. Current technology enables content to be downloaded onto and delivered from portable content storage devices (to playback devices) that can be provided by a vendor to an end user. Conventional digital rights management approaches such as software that are associated with the digital files do not provide the type of off-line managed time based control of access to the storage device itself or portions thereof needed to appropriately manage the access to digital files stored thereon.

In particular, such approaches are not suited to controlling access to content provided by a vendor to an end user on a storage device where off-line managed time based access to content that an end user is given possession of is needed. For example, offline administered exams or questionnaires that have been downloaded onto a content storage device and provided to exam takers where administrators designate a limited amount of time to provide answers for the exam or rented video content that is downloaded onto a content storage device where an end user has rented access to the video content for a certain amount of time. Importantly, conventional systems do not protect devices, volumes, folders or files from being open to reads and writes in an off-line scenario where the enforcement is directed free of the involvement of a network or a host operating system.

Conventional DRM technologies are not designed to provide time based limitations on access to content in situations such as those discussed above where termination of access has traditionally depended on end users voluntarily returning the content to the vendor. Accordingly, conventional approaches to controlling access to content are inadequate for vendors desiring to take advantage of current technologies that enable transfer of possession of digital content to end users on portable content storage devices. Accordingly, such approaches are not suitable where limited time wise access to the content of a storage device is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Time managed read and write access to a data storage device that can include content, such as exams and questionnaires or video content stored on a USB drive is disclosed. As a part of time managed read and write access to a data storage device, a request for read and/or write access to the data storage device is accessed and it is determined whether the request for read and/or write access is to be granted. Based on the determination, read and/or write access to the data storage device is either allowed or blocked. If read and/or write access is allowed, the access is terminated after the passage of a predetermined period of time that has been designated by the vendor or provider of the data storage device. The enforcement of access restrictions is performed by components that reside on the storage device.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
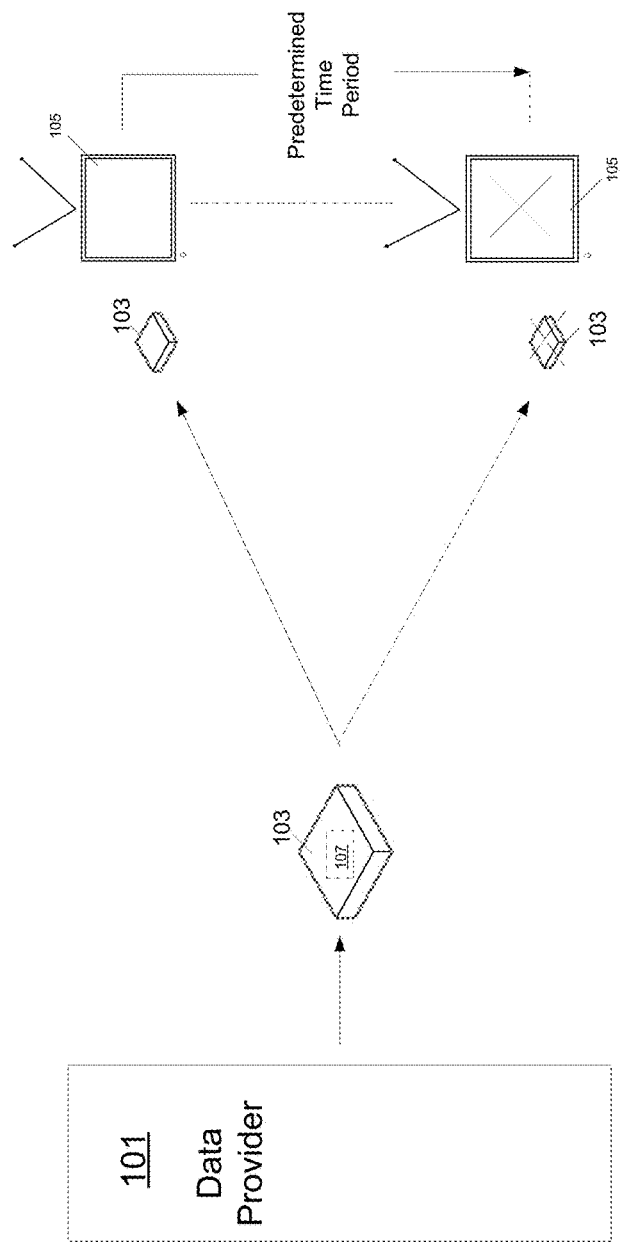
FIG. 1A shows an exemplary operational setting for a system for time managed read and write access to a storage device according to one embodiment.

Exemplary Setting of System for Time Managed Read and Write Access to a Data Storage Device According to Embodiments FIG. 1A shows an exemplary operational setting for system 107 for time managed read and write access to a data storage device according to one embodiment. In one embodiment, system 107 enables time based control over read and write access to a data storage device such that purchased and/or designated access can be enforced. Accordingly, system 107 limits the read and write access to a data storage device that possession of the data storage device itself lends to that which has been purchased or designated. Moreover, embodiments of system 107 extends such read and write access that is intended to be time wise limited to portable data storage devices free of the involvement of a network or a host CPU.

FIG. 1A shows data provider 101, time managed data storage device 103 and playback device 105.

Referring to FIG. 1A, data provider 101 provides data content to an end-user of the data content. In one embodiment, data provider 101 can include a vendor that provides data content to an end-user by providing the end-user a time managed data storage device 103 that stores the data content thereon or can include a data content providing device (e.g., a publicly accessible kiosk, for example, located in a store for downloading movies or other data content) under control of the vendor that a time managed data storage device 103 provided by the vendor can be coupled to for downloading content (e.g., a standardized test, movie etc.). In other embodiments, other type data content dispensing or providing systems can be employed.

Time managed data storage device 103 is a data storage device whose read and write accessibility is time limited. In one embodiment, time managed data storage device 103 can be a portable data content storage drive such as a USB drive or any other type data content storage drive capable or storing data content.

Playback device 105 plays back content that is stored by time managed data storage device 103. Playback device 105 can include a television, computer, or any other audio and/or video playback system that can access content from time managed data storage device 103 (such as a USB drive) and present the content to the data content end-user.

System 107 controls read and write access to time managed data storage device 103. In one embodiment, system 107 allows read and write access to time managed data storage device 103 for a predetermined period of time and thereafter prevents read and write access to time managed data storage device 103. In one embodiment, system 107 resides in memory of time managed data storage device 103 (see FIG. 1A). In one embodiment, system 107 can be implemented in hardware or a combination of hardware and software. In one embodiment, system 107 includes a hardware based content access blocking component.

In one embodiment, upon receipt of a request for read and write access to time managed data storage device 103, system 107 can determine whether the request is to be granted. If the request is granted, then read and write access to time managed data storage device 103 can be allowed for a predetermined period of time. In one embodiment, once the predetermined period of time has expired, the access that is granted by system 107 can be terminated. These operations are illustrated in FIG. 1B, and discussed with reference to FIG. 1B in the following section.

Operation

Figure 1B:
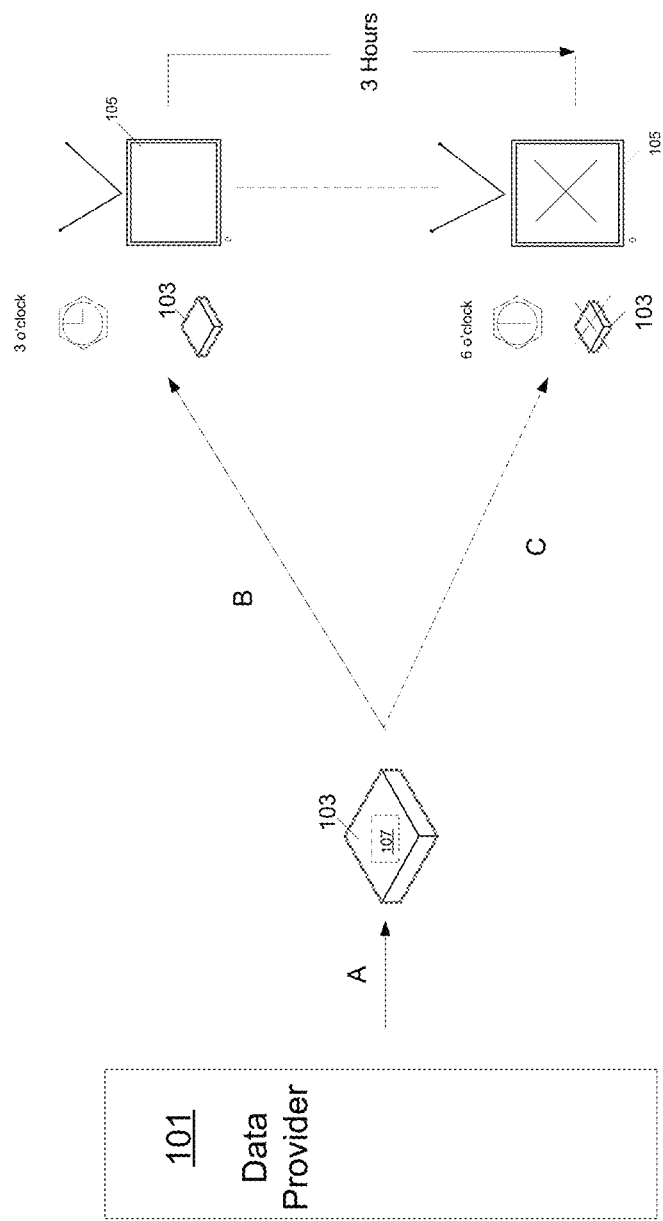
FIG. 1B illustrates operations A-C performed in a method for time managed read and write access to a storage device according to one embodiment.

FIG. 1B illustrates operations A-C performed in a process for time managed read and write access to a time managed data storage device according to one embodiment. These operations including the order in which they are presented are only exemplary. In other embodiments, other operations in other orders can be included.

Referring to FIG. 1B, at A time managed data storage device 103 is obtained directly from a vendor or kiosk owned by a vendor or data content is downloaded onto time managed storage device 103 from a vendor's data content providing device (e.g., data provider 101). At B time managed data storage device 103 is coupled to playback device 105. At C, after a predetermined time (in the FIG. 1B example three hours) read and write access to time managed data storage device 103 is terminated.

Exemplary Implementation Details

In one embodiment, access to the actual storage space of a storage drive (e.g., time managed data storage device 103 in FIG. 1A), is managed instead of access to files stored thereupon. In one embodiment, access to actual storage space is managed through an offline controlled policy. Examples of cases where the herein described system for managing access to actual storage space through an offline controlled policy can be implemented can include but are not limited to: (1) offline exams/questionnaires, where a limited amount of time is provided to read the questions sent in a USB drive and to provide answers before the USB drive is required to be sent back to examining authorities so that the exams/questionnaires can be graded, (2) video content, where such video content may be provided by video rental chains such as at content download points that can be provided at many different locations (e.g., grocery stores, airport lounges, libraries, etc.) and where a USB portable storage device that can only be accessed for a configurable period of time can be used to download a movie from a content download point. After that time, the device will be no longer allow access to the content and the content will be inaccessible unless the end user has been recharged for the content (e.g., after additional fees are collected).

In one embodiment, a time managed data storage device such as time managed data storage device 103 in FIG. 1A, can be assigned a monetary value that is decreased when a movie (s) is downloaded thereto. In one embodiment, when the monetary value is decreased to zero no additional downloads may be allowed. In one embodiment, a playback device, e.g., 105 in FIG. 1A, (TV with USB port, computer system with USB port, etc.) can be used to facilitate playback of the downloaded data content such as on an associated display. In one embodiment, in this manner the access and playback of rented DRM content (e.g., laptop on an airplane) can be enabled.

In one embodiment, as a part of the time based management of a data storage device, e.g., by system 107 in FIG. 1A, the device can be made active, for example, for one day, such that if the data storage device is lost (e.g., while on a vacation or business trip) read and write access to the data storage device can be predetermined to be inaccessible after the day or some other predetermined period of time. In this manner even if the data storage device is lent to another, and is forgotten to be retrieved, when read and/or write access to the data storage device is terminated, the person to whom it is lent will not have access to the content and thus will be prompted to return or discard the data storage device.

Importantly, exemplary embodiments allow the distribution of content (playback media, video, audio, time controlled write access to fill out answers, bids, an application such as a game) whose access is intended to be timewise limited in a manner that allows new licensing and revenue models to be realized. Additionally, as alluded to above, the time limited read and write access can serve to deter individuals from stealing the data storage devices since they understand that the device will need to be reactivated after a predetermined period of time. In one embodiment, means of activation can include but is not limited to: (1) pin based, and (2) connection with server to provide exchange of certificates.

In one embodiment, hardware technology can be used to provide a hardware lock of contents of USB drive where access may be read only or read/write access. In one embodiment, enforcement can be entirely performed on the client side (from the time managed data storage device, e.g., 103 in FIG. 1A) at the hardware level with an offline controlled policy.

Exemplary embodiments, in addition to theft deterrent provide protection for sensitive information that will not be available after a configurable period of time. In one embodiment, tampering detection mechanisms (see FIG. 3 discussion below) can be employed that can lock the data storage device even if the predetermined time for access has not expired (if there is any indication of an attempt to tamper with the lock).

Figure 3:
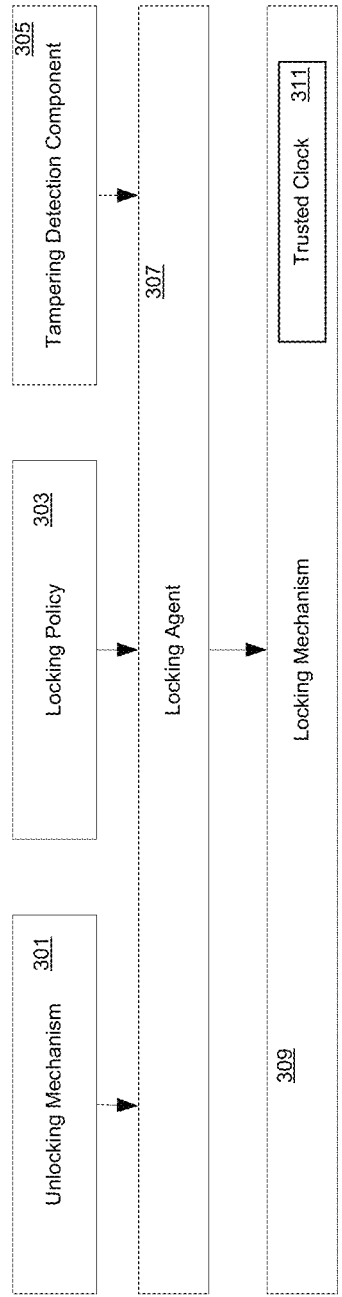
FIG. 3 shows a functional block diagram of components that are a part of an implementation of the system shown in FIG. 2 according to one embodiment, of the present invention.

In one embodiment, access to the storage space in the storage device can be controlled by a locking policy (see discussion made with reference to FIG. 3). The locking policy can determine the parts of the storage device that are accessible and the type of access that is provided to each of them. In one embodiment, the locking policy can be set by an administrator of the device and can be enforced by the locking agent and the locking mechanism. In one embodiment, the locking mechanism can rely on a trusted clock that can either reside inside of the data storage device or can be provided by a trusted time server. In another embodiment, the locking mechanism can rely on an internal counter that is decremented as the data storage device is being used. In one embodiment, a tampering detection mechanism can lock the data storage device if any attempt to manipulate the trusted clock or if any attempt to tamper with the locking mechanism is detected.

Figure 2:
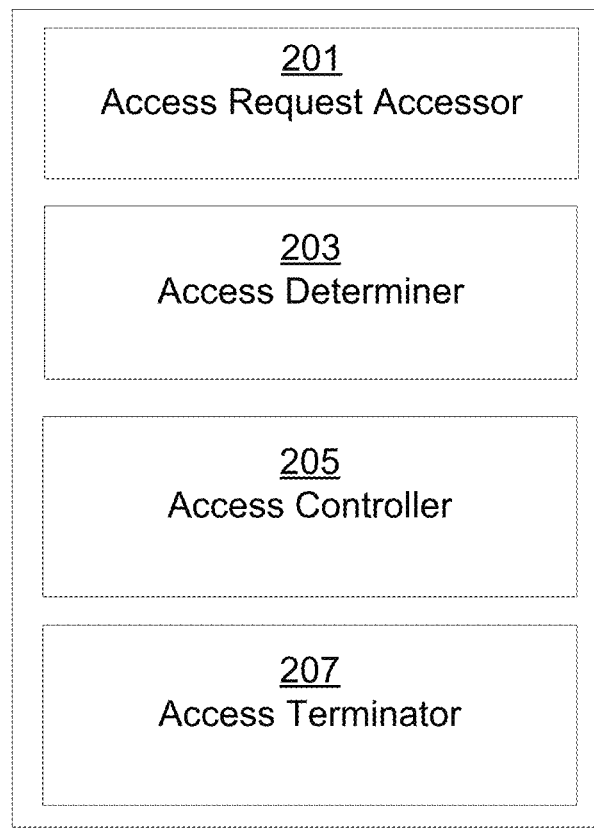
FIG. 2 shows components of a system for time managed read and write access to a data storage device according to one embodiment.

Components of System for Time Managed Read and Write Access to a Data Storage Device According to Embodiments FIG. 2 shows components of a system 107 for time managed access to a data storage device contents according to one embodiment. In one embodiment, system 107 implements an algorithm for data storage device based time managed read and write access to a data storage device. In the FIG. 2 embodiment, system 107 includes access request accessor 201, access determiner 203, access controller 205 and access terminator 207.

It should be appreciated that aforementioned components of system 107 can be implemented in hardware or in a combination of hardware and software. In one embodiment, components and operations of system 107 can be encompassed by components and operations of one or more computer programs (e.g. program on board a digital storage device). In another embodiment, components and operations of system 107 can be separate from the aforementioned one or more computer programs but can operate cooperatively with components and operations thereof.

Referring to FIG. 2, access request accessor 201 accesses requests for read and/or write access to a data storage device (e.g., 103 in FIG. 1A). In one embodiment, request for read and/or write access to a data storage device can involve but is not limited to the selection of an icon for playback for viewing of associated data content on a computer, the selection of a digital file for playback of associated content on a television or other playback device. In one embodiment, requests for read and/or write access to a data storage device can be made in concert with the provision of a pin or with the connection of the data storage device to a server for exchange of certificates.

Access determiner 203 determines whether a request for read and/or write access to a data storage device is to be granted. In one embodiment, access determiner 203 makes its determination based on a locking policy that can be set by the vendor or other administrator. In one embodiment, the locking policy can determine which parts of the data storage device that are accessible and the type of access granted for each part.

Access controller 205 allows or blocks read and/or write access to its associated data storage device (e.g., 103 in FIG. 1A). In one embodiment, access controller 205 can comprise a hardware logic circuit that is configured to either allow or block access to memory storage space of the data storage device.

Access terminator 207 terminates read and/or write access to its associated data storage device (e.g., 103 in FIG. 1A) after a predetermined time has expired. In one embodiment, access terminator 207 triggers the blocking of read and/or write access to memory storage space of the content storage device by access controller 205 after a predetermined period of time. In one embodiment, access terminator 207 can include but is not limited to a trusted clock or an internal counter that is decremented as the device is being used.

Exemplary Implementation

FIG. 3 shows a block diagram 300 of functional components of an implementation of the system 107 discussed with reference to FIG. 2 according to one embodiment of the present invention. It should be appreciated that FIG. 3 shows an implementation according to one embodiment, however, in other embodiments, other implementations can be employed. In the FIG. 3 embodiment, the aforementioned functional components include unlocking mechanism 301, locking policy 303, tampering detection 305, locking agent 307, locking mechanism 309 and trusted clock.

Referring to FIG. 3, unlocking mechanism 301 accesses authentication data that is provided by a user. In one embodiment, the authentication data can include a pin, password or other type authenticating mechanism that is provided by the user.

Locking policy 303 determines which parts of a data storage device are accessible to a user that has been granted access. Moreover, locking policy 303 determines the type of access that is allowed for each part of the drive. In one embodiment, the locking policy can be set by the vendor or other administrator of the associated data storage device (e.g., 103 in FIG. 1A).

Tampering detection component 305 monitors the associated data storage device for evidence of device tampering. If device tampering is detected, tampering detection component 305, via locking agent 307 can cause the drive to be locked. In one embodiment, upon detection of evidence of device tampering by tampering detection component 305, locking mechanism 307 can be prompted by locking agent 307 to block read and write access to the associated data storage device (e.g., 103 in FIG. 1A).

Locking agent 307 enforces the locking policy that is set by the vendor or other administrator of the device (see access determiner 203 in FIG. 2). In the FIG. 3 embodiment, locking agent receives inputs from unlocking mechanism 301, locking policy 303 and tampering detection component 305. In one embodiment, locking agent 307 determines whether or not a request for read or write access to the data storage device is to be granted. More specifically, locking agent grants or denies access to said data content that is stored on the data storage device based on the legitimacy of the authenticating (unlocking) mechanism 301, the locking policy 301 and whether or not tampering has been detected by tampering detection component 305.

Locking mechanism 309 is a hardware mechanism that unlocks or locks the associated data storage device, or designated portions thereof, to either allow or block access to its content (see access controller 205 in FIG. 2). In one embodiment, locking mechanism can be prompted by locking agent 307 to allow or block read and/or write access to the data storage device. In the FIG. 3 embodiment, locking mechanism 309 can rely on trusted clock 311 that can either reside inside of the data storage device or be provided by a trusted time server to indicate when access that has been granted can be terminated by locking mechanism 309. In another embodiment, locking mechanism 309 can rely on an internal counter that can reside on the data storage device and that can be decremented as the device is being used to indicate when access that has been granted can be terminated.

Trusted Clock 311 is the time reference upon which read and/or write access to a data storage device is based (see access terminator 207 in FIG. 2). In one embodiment, trusted clock 311 can reside inside of the data storage device or can be provided by a trusted time server. In one embodiment, trusted clock 311 can provide an indication to locking mechanism 309 when access to data content that is stored on the associated drive can be terminated.

Figure 4:
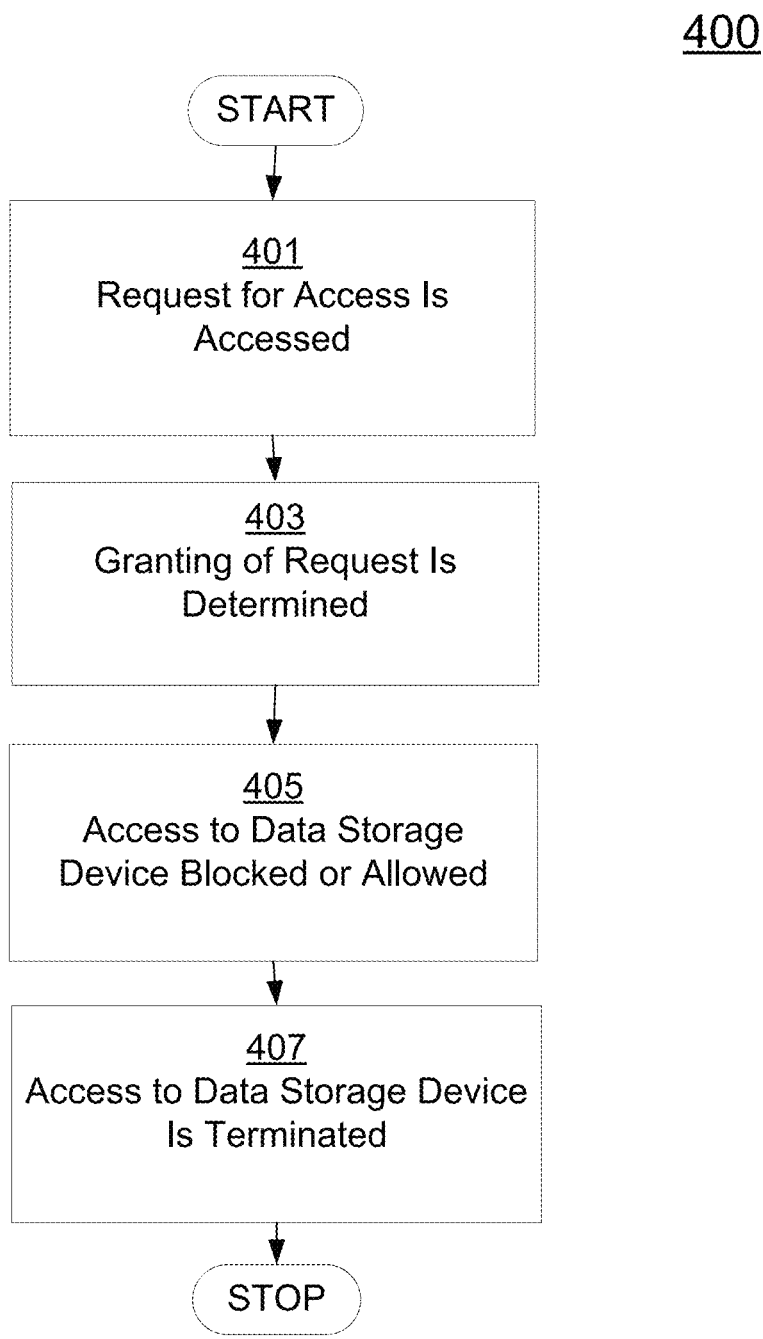
FIG. 4 shows a flowchart of the steps performed in a method for time managed read and write access to a data storage device according to one embodiment.

Exemplary Operations of Method for Time Managed Read and Write Access to a Data Storage Device According to Embodiments FIG. 4 shows a flowchart 400 of the steps performed in a method for time managed read and write access to a data storage device according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 4, at step 401, a request for read and/or write access to a data storage device is received. In one embodiment, requests for read and/or write access to a data storage device can involve but are not limited to the provision of a pin or the connection of the data storage device with a server for exchange of certificates.

At step 403, it is determined whether the request for read and/or write access to the data storage device, made at step 401, is to be granted. In one embodiment, an access determiner (e.g., 203 in FIG. 2) makes its determination based on a locking policy that can be set by an administrator. In one embodiment the locking policy can determine which parts of the data storage device that are accessible and the type of access granted for each part.

At step 405 read and/or write access to the data storage device is either blocked or allowed. In one embodiment, an access controller (e.g., 205 in FIG. 2) can be used to block or allow access to data content that can comprise a hardware logic circuit that is configured to either block or allow access to memory storage space of the data storage device.

At step 407, read and/or write access to the data storage device is terminated after a predetermined period of time has expired. In one embodiment, an access terminator (e.g., 207 in FIG. 2) can be used to trigger the blocking of access to memory storage space of the data storage device by access controller (e.g., 205 in FIG. 2) after a predetermined period of time. In one embodiment, the access terminator (e.g., 207 in FIG. 2) can include but is not limited to a trusted clock or an internal counter that is decremented as the data storage device is being used.

Exemplary Hardware

Figure 5:
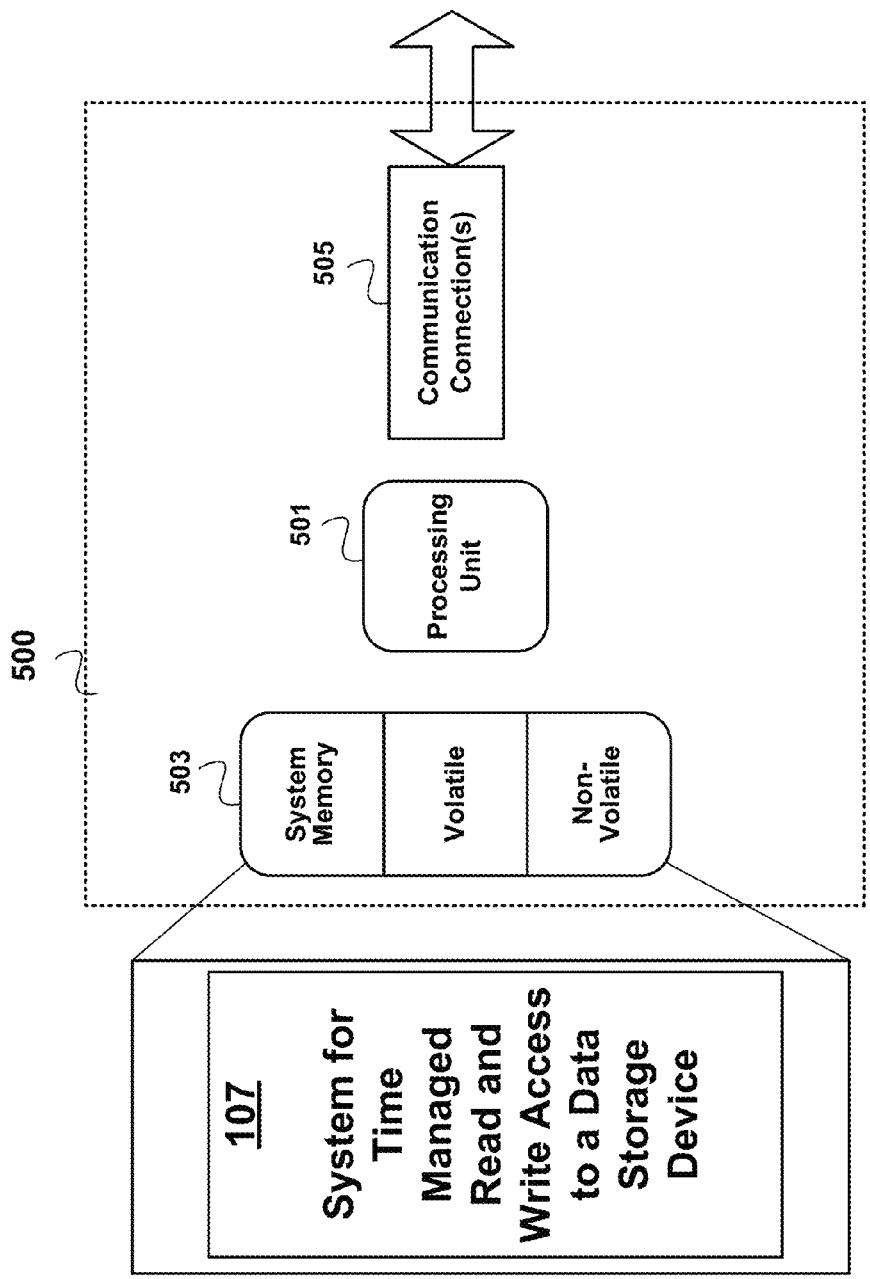

FIG. 5 shows a block diagram of components of an exemplary time managed data storage device 500 according to one embodiment. Referring to FIG. 5, time managed data storage device 500 typically includes at least some form of computer readable media. Computer readable media can be any available media that can be accessed by time managed content storage device and can include but is not limited to computer storage media.

In its most basic configuration, time managed data storage device 500 typically includes processing unit 501 and system memory 503 (which can include system 107 described with reference to FIGS. 1A, 1B and 2). Depending on the exact configuration and type of time managed data storage device 500 that is used, system memory 503 can be volatile (such as RAM), non-volatile (such as ROM, flash memory, etc.) or some combination of the two.

Additionally, time managed data storage device 500 can include communication connection 505 to facilitate coupling to devices such as computers, networks, servers, etc. As all of these devices are well known in the art, they need not be discussed in detail.

With reference to exemplary embodiments thereof, storage device based time managed read and write access to data storage devices is disclosed. As a part of time managed read and write access to a data storage device, a request for read and/or write access to the data storage device is accessed and it is determined whether the request for read and/or write access to the data storage device is to be granted. Based on the determination, read and/or write access to the data storage device is either allowed or blocked. If access is allowed, access is terminated after passage of a predetermined period of time.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for time managed read and write access to a time managed data storage device, comprising:
   accessing a request for read or write access to storage space of said time managed data storage device;
   determining whether said request for read or write access to said storage space of said time managed data storage device is to be granted, based on a data storage device based time policy, said policy providing limitations on said read or write access;
   allowing or blocking read or write access to said storage space of said time managed data storage device; and
   if said read or write access to said storage space is allowed, terminating said read or write access to said storage space after passage of a predetermined period of time.

2. The method of claim 1 wherein said allowing or blocking said read or write access to said time managed data storage device is performed by hardware components.

3. The method of claim 1 wherein said allowing or blocking said read or write access to said time managed data storage device is carried out completely from said time managed data storage device based on an offline controlled policy.

4. The method of claim 1 further comprising monitoring said time managed data storage device for tampering.

5. The method of claim 1 further comprising terminating said read or write access to said storage space of said time managed data storage device before said passage of said predetermined period of time if tampering with said time managed data storage device is detected.

6. The method of claim 1 wherein said termination of read or write access is based on a clock that is resident in said time managed data storage device or on a time server.

7. The method of claim 1 wherein said read and write access to said data storage space in said time managed data storage device is controlled by a locking policy that is determined by a storage device administrator.

8. The method of claim 7 wherein said locking policy determines which parts of said storage space of said time managed data storage device are accessible and the type of access that is granted for each of said parts of said time managed data storage device.

9. A method for data storage device based time policy managed read and write access to said data storage device, comprising:
receiving a request for read or write access to storage space of said data storage device;
ascertaining whether said request for read or write access to said storage space of said data storage device is to be granted based on said data storage device based time policy, said policy providing limitations on said read or write access;
allowing or blocking read or write access to said storage space of said data storage device, based on said ascertaining, using a hardware mechanism; and
if said read or write access to said storage space of said data storage device is allowed, terminating said read or write access based on said policy.

10. The method of claim 9 wherein said limitations on said read or write access comprise a requirement that a valid password be provided or a requirement that a valid login ID be provided or is related to a period of time for which read or write access is to be granted.

11. The method of claim 9 wherein said allowing or blocking of said read or write access to said storage space of said data storage device is performed by hardware components in response to a detection of tampering.

12. The method of claim 9 wherein said allowing or blocking said read or write access to said storage space of said data storage device is performed entirely from said data storage device based on an offline controlled policy.

13. The method of claim 9 further comprising terminating said read or write access to said storage space of said data storage device before a predetermined time for termination if tampering with said data storage device is detected.

14. The method of claim 9 wherein said termination of said read or write access is based on a clock or a time server.

15. The method of claim 9 wherein read or write access to storage space in said data storage device is controlled by a locking policy that is determined by an administrator of said data storage device.

16. The method of claim 15 wherein said locking policy determines which parts of said storage space of said data storage device are accessible and the type of read or write access that is granted for each of said parts of said data storage device.

17. A time managed data storage drive comprising:
an interface component for coupling said drive with a content playback device;
a data content storage component coupled to said interface component; and
a processor coupled to said content storage component, said processor for executing operations for time managed read and write access to storage space of said time managed data storage drive, comprising:
accessing a request for read or write access to said storage space of said time managed data storage drive;
determining whether said request for read or write access to said storage space of said time managed data storage drive is to be granted, based on a data storage device based time policy, said policy providing limitations on said read or write access;
allowing or blocking read or write access to said storage space of said time managed data storage drive; and
if read or write access is allowed, terminating read or write access after passage of a predetermined period of time.

18. The drive of claim 17 wherein said allowing or blocking read and write access to said storage space of said time managed data storage drive is performed by hardware components.

19. The drive of claim 17 wherein said allowing or blocking said read or write access to said storage space of said time managed data storage drive is performed entirely from said time managed data storage drive based on an offline controlled policy.

20. The drive of claim 17 further comprising monitoring said time managed data storage drive for tampering.

* * * * *